(12) United States Patent
Smith et al.

(10) Patent No.: US 12,507,166 B2
(45) Date of Patent: Dec. 23, 2025

(54) ORCHESTRATED ROAMING POINT (71) Applicant: Cisco Technology, Inc., San Jose, CA (US)

(72) Inventors: Malcolm M. Smith, Richardson, TX (US); Brian D. Hart, Sunnyvale, CA (US); Jerome Henry, Pittsboro, NC (US); Pooya Monajemi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 413 days.

(21) Appl. No.: 18/311,062

(22) Filed: May 2, 2023

(65) Prior Publication Data
US 2024/0373333 A1 Nov. 7, 2024

(51) Int. Cl.
H04W 48/18 (2009.01)
H04L 47/34 (2022.01)
H04W 36/08 (2009.01)

(52) U.S. Cl.
CPC ............. H04W 48/18 (2013.01); H04L 47/34 (2013.01); H04W 36/08 (2013.01)

(58) Field of Classification Search
CPC .................................................... H04W 48/18
USPC ....................................................... 455/435
See application file for complete search history.

(56) References Cited

U.S. PATENT DOCUMENTS

2007/0230493 A1* 10/2007 Dravida .............. H04L 49/9073
                                                    370/412
2013/0156007 A1    6/2013 Kim et al.
2015/0141015 A1    5/2015 Zhang et al.
2015/0148031 A1*   5/2015 He ........................ H04W 84/12
                                                    455/432.1
2015/0382255 A1*  12/2015 Dimou ............ H04W 36/00837
                                                    455/436
2016/0205536 A1*   7/2016 Batchu .................. H04L 5/0048
                                                    455/558

(Continued)

FOREIGN PATENT DOCUMENTS

WO    2022261831 A1    12/2022

OTHER PUBLICATIONS

International Search Report and Written Opinion for International Application No. PCT/US2024/025255, mailed Aug. 6, 2024, 17 Pages.

*Primary Examiner* — Qutbuddin Ghulamali
(74) *Attorney, Agent, or Firm* — Patterson + Sheridan, LLP (57) ABSTRACT Techniques for wireless device roaming are disclosed. These techniques include identifying a wireless client entity for roaming from a first infrastructure entity to a second infrastructure entity. The techniques further include agreeing, between the client entity and the first infrastructure entity, on one or more roaming conditions defined using transition parameters for transition of a first data flow for the client entity from the first infrastructure entity to the second infrastructure entity, the one or more transition parameters including a sequence number relating to the dataflow. The techniques further include determining that a first condition defined in terms of a transition parameter of the agreed one or more roaming conditions is met, and, based on the determining, transitioning from providing the first dataflow from the first infrastructure entity to the client entity to providing the first data flow from the second infrastructure entity to the client entity.

20 Claims, 5 Drawing Sheets (56) References Cited

U.S. PATENT DOCUMENTS

| | | |
|---|---|---|
| 2018/0227815 A1 | 8/2018 | Sharma |
| 2019/0150041 A1 | 5/2019 | Shao |
| 2021/0235335 A1 | 7/2021 | Yang et al. |
| 2024/0129794 A1* | 4/2024 | Talebi Fard .......... H04W 48/18 |

* cited by examiner

ORCHESTRATED ROAMING POINT

TECHNICAL FIELD

Embodiments presented in this disclosure generally relate to wireless communication. More specifically, embodiments disclosed herein relate to roaming for devices in wireless communications.

BACKGROUND

In a typical WiFi deployment, a wireless station (STA) may roam from one wireless access point (AP) to another AP (e.g., as the STA moves in physical space). Achieving seamless roaming for these STAs is very challenging, including for STAs operating with dual radios (e.g., in a multi-link operation (MLO) implementation with multi-link devices (MLDs)). For example, existing roaming techniques may not appropriately take into account queued data at a source AP and the integrity of the stream of media access control (MAC) service data units (MSDUs).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a method. The method includes identifying a wireless client entity for roaming from a first infrastructure entity to a second infrastructure entity. The method further includes agreeing, between the client entity and the first infrastructure entity, on one or more roaming conditions defined using transition parameters for transition of a first data flow for the client entity from the first infrastructure entity to the second infrastructure entity, the one or more transition parameters including a sequence number relating to the data flow. The method further includes determining that a first condition defined in terms of a transition parameter of the agreed one or more roaming conditions is met and, based on the determining, transitioning from providing the first data flow from the first infrastructure entity to the client entity to providing the first data flow from the second infrastructure entity to the client entity.

Embodiments further include a system, including a processor and a memory having instructions stored thereon which, when executed on the processor, performs operations. The operations include identifying a wireless client entity for roaming from a first infrastructure entity to a second infrastructure entity. The operations further include agreeing, between the client entity and the first infrastructure entity, on one or more roaming conditions defined using transition parameters for transition of a first data flow for the client entity from the first infrastructure entity to the second infrastructure entity, the one or more transition parameters including a sequence number relating to the data flow. The operations further include determining that a first condition defined in terms of a transition parameter of the agreed one or more roaming conditions is met and, based on the determining, transitioning from providing the first data flow from the first infrastructure entity to the client entity to providing the first data flow from the second infrastructure entity to the client entity.

Embodiments further include a non-transitory computer-readable medium having instructions stored thereon which, when executed by a processor, performs operations. The operations include identifying a wireless client entity for roaming from a first infrastructure entity to a second infrastructure entity. The operations further include agreeing, between the client entity and the first infrastructure entity, on one or more roaming conditions defined using transition parameters for transition of a first data flow for the client entity from the first infrastructure entity to the second infrastructure entity, the one or more transition parameters including a sequence number relating to the data flow. The operations further include determining that a first condition defined in terms of a transition parameter of the agreed one or more roaming conditions is met and, based on the determining, transitioning from providing the first data flow from the first infrastructure entity to the client entity to providing the first data flow from the second infrastructure entity to the client entity.

Example Embodiments

In existing systems, a client can operate as an individual STA or as multiple STAs affiliated with a non-AP MLD (e.g., according to the 802.11 standard and optionally including its 802.11be amendment) and can use break-before-make, including Fast Transition roaming. As another example, a dual radio can operate as two non-MLD dual-connected non-AP STAs (clients), typically with different IP addresses. In the former situation it is challenging to ensure that MSDUs are appropriately handled during the roaming transition. For example, MSDUs queued at the source AP/AP MLD may be lost during the transition of the non-AP STA/non-AP MLD to the target AP/AP MLD. Traditional approaches (e.g., 802.11r) do not maintain MAC queue state, and other solutions simply transition MSDUs without regard to the integrity of the stream of MSDUs, and may allow duplicate delivery and out of order delivery of the MSDUs. In the following, we use the term "AP" to encompass either an AP or an AP MLD, and "STA" to encompass either a non-AP STA or a non-AP MLD.

In an embodiment, roaming can be improved using one or more techniques described below. For example, roaming conditions defined in terms of transition parameters can be agreed upon between the source AP and the STA before the transition occurs. These roaming conditions and transition parameters can include when time reaches a transition time, and a transition sequence number condition, such as the first or all of a set of sequence number counter(s) for flow(s) each reaching their specified transition sequence number(s). In the case of multiple transition sequence numbers, each sequence number can be set on a per data flow (e.g., per traffic identifier (TID)) basis.

In an embodiment, this gives time for the source and target APs to coordinate MSDU and MPDU transfer and ensure contracted services (e.g., target wake time (TWT) and stream classification service (SCS)) can be scheduled or re-scheduled e.g., Next TWT. Further, it gives an ultimatum to the STA to transition to the target AP, past which the source AP is no longer required to provide buffering.

In addition, agreed upon sequence numbers (e.g., MPDU sequence numbers per TID, where an MPDU contains a single MSDU or an aggregation of MSDUs (A-MSDU)) are useful since they provide a locally-unique, ordered identification of the underlying MSDUs and their expected ordering where the identification is common to source AP, target AP and STA. With this common, ordered identification, the APs and the STA can deliver MSDUs between their upper layers in order and without duplication. In an embodiment, a source AP and an STA can agree on both a time at which transition should occur, and a sequence number condition at which transition should occur (e.g., the first or all of MPDU sequence number counter(s) for one or more TIDs reach specified transition sequence number(s)), and roaming can occur whenever either condition is met (e.g., at the point at which the time, or sequence number condition is met, whichever comes first). This is discussed further, below, with relation to FIGS. 3-4, and 6.

Any frame for a TID after the sequence number parameter can be automatically moved to the target AP. Further, as discussed further, below, in relation to FIGS. 5-6, any pending frames after transition can be retrieved by the target AP from the source AP or transmitted from the source AP to the target AP (e.g., using one or more suitable tunnels). MSDUs for different TIDs can be provided from both the source AP and the target AP to the STA during the transition period (e.g., using links on a common radio frequency (RF) channel or by using different RF channels or MLD links).

Figure 1:
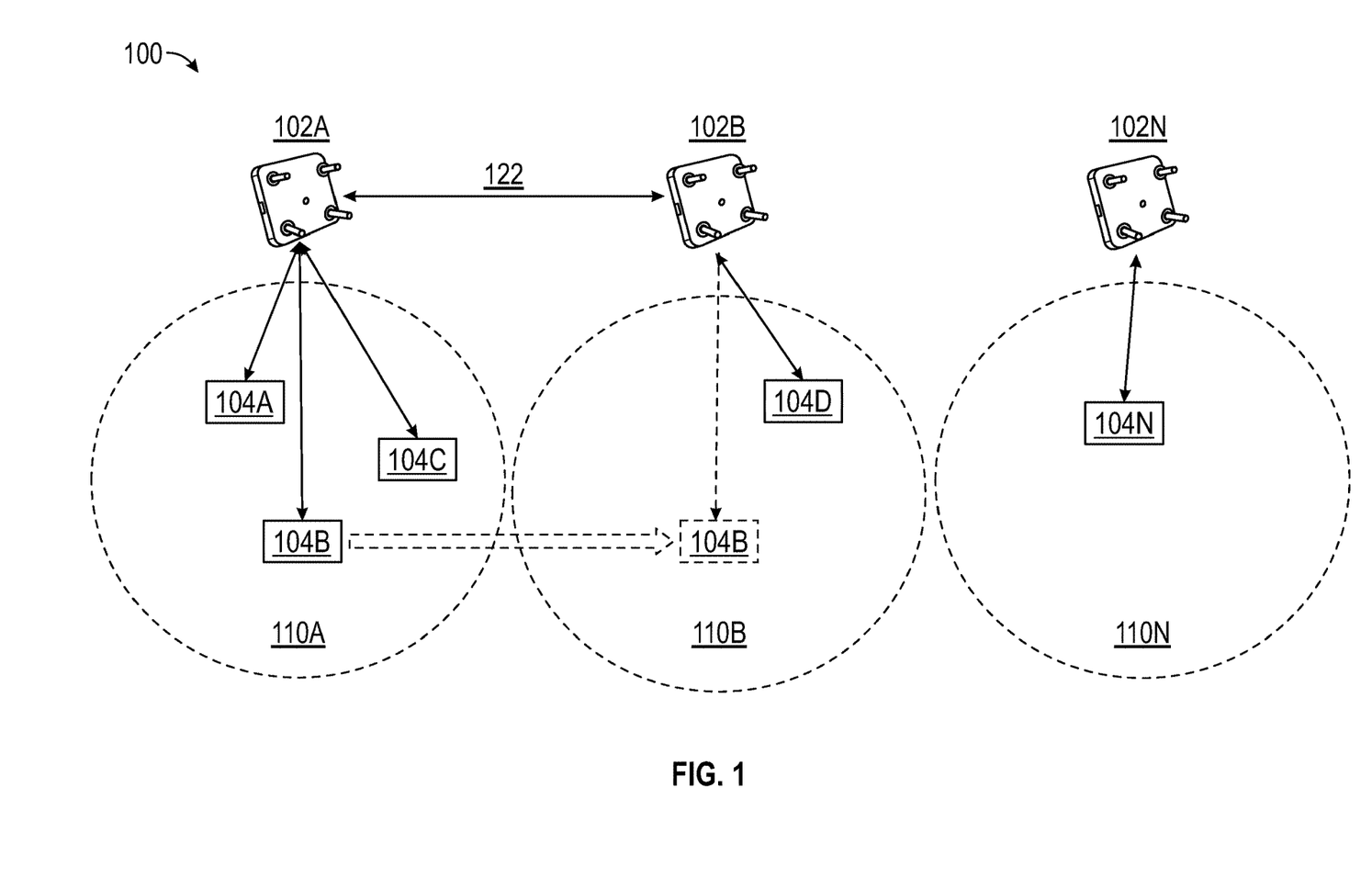
FIG. 1 illustrates a wireless networking environment for orchestrated STA roaming, according to one embodiment.

FIG. 1 illustrates a wireless networking environment 100 for orchestrated STA roaming, according to one embodiment. In an embodiment, the environment 100 includes a number of APs 102A-N. Each of the APs is associated with one or more STAs 104A-N. The APs 102A-N are examples of infrastructure entities in the wireless networking environment 100d, but any suitable infrastructure entities can be used. The STAs 104A-N are examples of client entities in the wireless networking environment 104A-N, but any suitable client entities can be used.

For example, the AP 102A has three STAs 104A-C associated as part of a basic service set (BSS) 110A. The AP 102B has the STA 104D associated as part of a BSS 110B. The AP 102N has STA 104N associated as part of a BSS 110N. This is merely an example, and the environment 100 can include any suitable number and configuration of wireless devices. Further, each of the STAs 104A-N can be any suitable wireless device, including a laptop computer, a desktop computer, a smartphone, a tablet, an internet of things (IoT) device, a vehicle, another suitable user device, or a wireless network infrastructure device (e.g., a wireless access point (AP)).

In an embodiment, one or more of the STAs are portable and can roam between AP's 102A-N and BSSs 110A-N. For example, assume the STA 104B is mobile and roams from association with a source AP 102A to association with the target AP 102B. Further, assume that the AP 102A, the AP 102B, and the STA 104B are MLDs (e.g., with dual-link connections) and support "Distributed MLO" or "Extended MLO" or "MLO++" capability (e.g., with multiple connections, each using one or more links, to multiple devices). The AP 102A can maintain a connection with both the AP 102B and its respective STAs in the BSS 110A, while the STA 104B can maintain a connection with both the AP 102A and another device (e.g., the AP 102B during a roaming transition).

As discussed further, below, in relation to FIGS. 3-6, in an embodiment the AP 102A, STA 104B, and AP 102B can agree on a number of roaming conditions defined in terms of transition parameters to orchestrate roaming by the STA 104B from the source AP 102A to the target AP 102B. These roaming transition parameters can include a transition time, parameters for a transition sequence number condition (e.g., a list of TIDs, an MPDU sequence number for each listed TID, whether roaming occurs when the condition is reached for any listed TID or for all listed TIDs, and any other suitable parameters). Alternatively, the TID list may be omitted since the list (e.g., all TIDs) can be agreed on ahead of time (e.g. defined in an amendment). In an embodiment, a combining function can also be used (e.g., if the listed TIDs are permitted to be more than one entry long). When any of the roaming transition conditions are met, roaming can be enforced for the STA 104B. This allows the source AP 102A to maintain significantly smaller queues during roaming, because it need only maintain data (e.g., any or all of MSDUs, AMSDUs, and MPDUs) in its queue(s) up to the agreed upon sequence number. It also maintains integrity of the stream of MSDUs delivered to upper layers by orchestrating the transition of MSDUs/AMSDUs/MPDUs during roaming.

Figure 2:
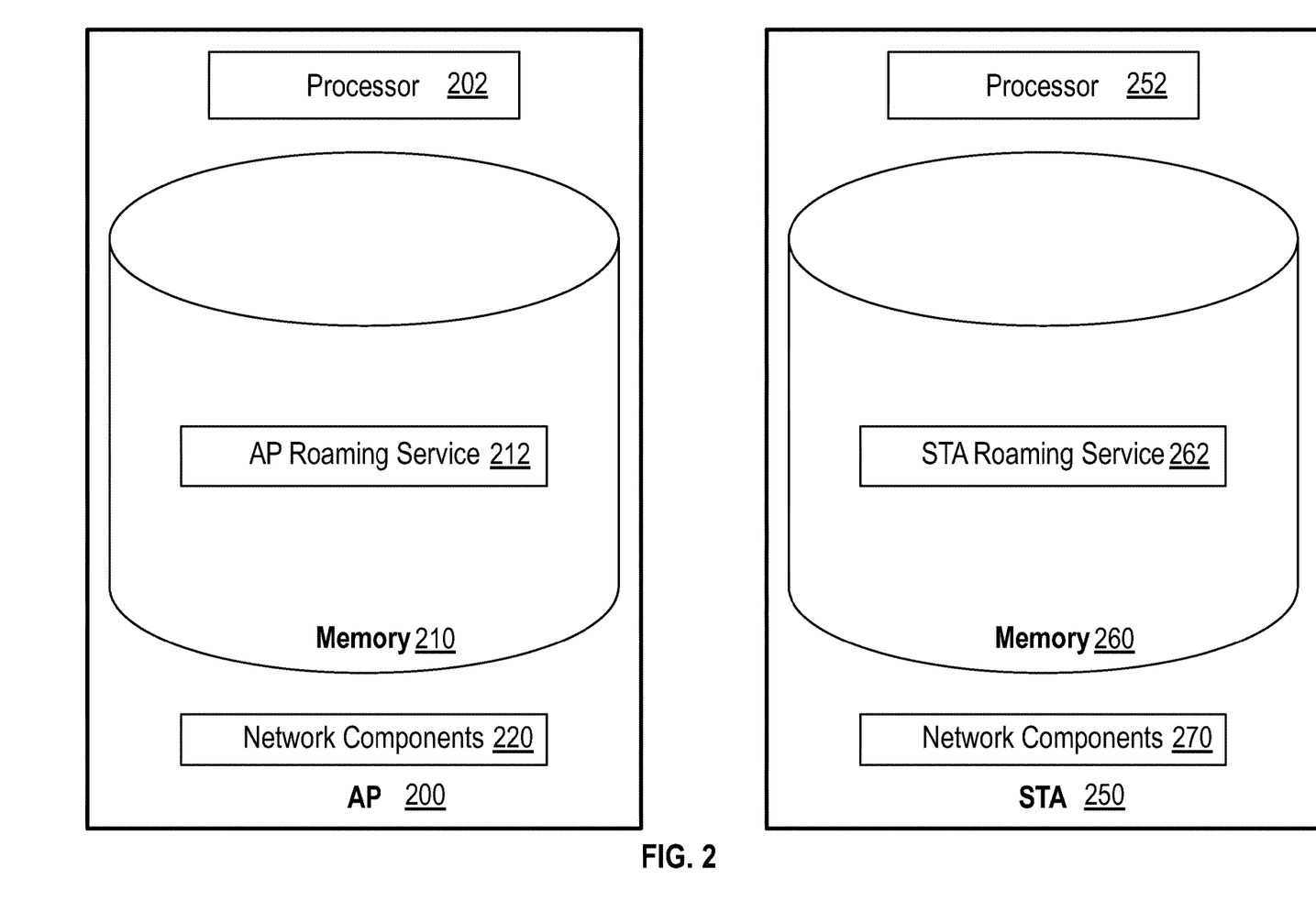
FIG. 2 illustrates block diagrams for an AP and an STA, according to one embodiment.

FIG. 2 illustrates block diagrams for an AP 200 and an STA 250, according to one embodiment. In an embodiment, the AP 200 can correspond with any of the APs 102A-N illustrated in FIG. 1, and the STA 250 can correspond with any of the STAs 104A-N illustrated in FIG. 1.

The AP 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 200. The program code is generally described as various functional "applications" or "modules" within the memory 210, although alternate implementations may have different functions and/or combinations of functions. Within the memory 210, the AP Roaming service 212 facilitates orchestrated STA roaming (e.g., orchestrated roaming for dual-radio STAs). This is discussed further, below, with regard to FIGS. 3-5. Further, using an AP 200 for orchestrated roaming is merely one example. Alternatively, or in addition, any other network device (e.g., a wireless local area network (WLAN) controller (WLC) or another network component) can be used.

The STA 250 includes a processor 252, a memory 260, and network components 270. The processor 252 generally retrieves and executes programming instructions stored in the memory 260. The processor 252 is representative of a single CPU, multiple CPUs, a single CPU having multiple processing cores, graphics processing units (GPUs) having multiple execution paths, and the like.

The network components 270 include the components necessary for the STA 250 to interface with a communication network, as discussed above in relation to FIG. 1. For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the STA 250. The program code is generally described as various functional "applications" or "modules" within the memory 260, although alternate implementations may have different functions and/or combinations of functions. Within the memory 260, the STA roaming service 262 facilitates orchestrated STA roaming (e.g., orchestrated roaming for dual-radio STAs). This is discussed further, below, with regard to FIGS. 3-5. Further, using an STA 250 for orchestrated is merely one example. Alternatively, or in addition, any other network device (e.g., the AP 200, a WLC or another network component, or any suitable combination) can be used.

Figure 3:
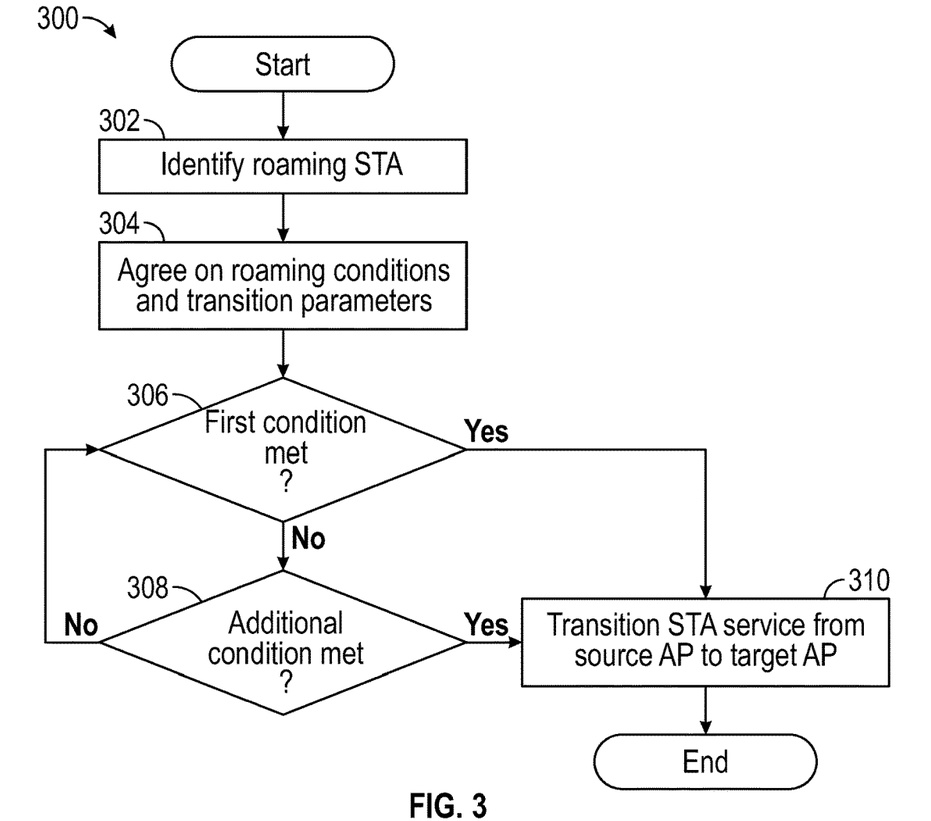
FIG. 3 is a flowchart illustrating orchestrated STA roaming, according to one embodiment.

FIG. 3 is a flowchart 300 illustrating orchestrated STA roaming, according to one embodiment. At block 302, a roaming service (e.g., the AP roaming service 212 illustrated in FIG. 2, the STA roaming service 262 illustrated in FIG. 2, or any other suitable service) identifies a roaming STA. For example, as illustrated in FIG. 1, the STA 104B can roam from a source AP 102A to a target AP 102B. A roaming service operating at the STA 104B, the AP 102A, any combination of the two, or any other suitable component (e.g., a controller) can identify that the STA 104B is roaming.

At block 304, the roaming STA and one or more APs agree on roaming conditions and transition parameters. For example, the roaming STA and APs (e.g., the source AP, target AP, or both) can agree on a handover time and transition sequence number(s) for a set of flows (e.g., sequence number(s) for one or more TIDs). These are merely examples, and any suitable conditions and parameters can be used. The STA is then required to transition when the first of these conditions is met, and the source AP can set its queue accordingly to avoid queuing data (e.g., MAC protocol data units (MPDUs) and MSDUs) after the transition. This is discussed further, below, with regard to FIG. 4.

At block 306, the roaming service determines whether a first roaming transition condition is met. For example, as discussed above and below in relation to FIG. 4, the first roaming transition condition can be a sequence condition defined in terms of transition parameters. In an embodiment, the roaming service enforces transition using multiple roaming conditions defined in terms of transition parameters (e.g., a handover time and sequence number(s) for TID(s)). The roaming service can monitor both conditions defined in terms of parameters (e.g., the time and the sequence number(s)), and can transition from the source AP to the target AP when either condition is met.

Thus, whichever parameter is reached first (e.g., the handover time or the sequence number condition) triggers the transition of MSDUs (including AMSDUs, MPDUs and AMPDUs) from the source AP to the target AP. At block 306, the roaming service determines whether the sequence condition is met (e.g., a per-TID sequence counter reaches a sequence number parameter). If so, the flow proceeds to block 310. If not, the flow proceeds to block 308. While the sequence number condition is discussed as the first roaming transition condition, this is merely an example. A condition using the handover time parameter, or any other suitable roaming condition using transition parameter(s), can be analyzed at block 306.

At block 308, the roaming service determines whether an additional roaming condition based on transition parameters is met. For example, the roaming service can use a handover time as a second roaming transition condition and parameter. At block 308, the roaming service determines whether an agreed handover time is met. If so, the flow proceeds to block 310. If not, the flow returns to block 306 and determines whether the first roaming transition condition is met. In an embodiment, the roaming service operates intermittently, following specified events, or includes a suitable waiting period between checking whether the roaming transition conditions are met.

At block 310, the roaming service transitions STA service from the source AP to the target AP. For example, this can include transmitting pending frames from the source AP to the target AP. Further, where different data flows (e.g., different TID data flows) are transitioned at different time instants (e.g., their sequence number counters are in different states, they have different MPDU arrival rates, the transition parameters include different sequence number, or any combination of these), data may be served to the STA from both the source AP and target AP during a transition period. The roaming service can coordinate servicing the STA using the source AP, the target AP, or a combination of both, depending on the state of the per-TID transitions. This is discussed further, below, with regard to FIG. 5.

Figure 4:
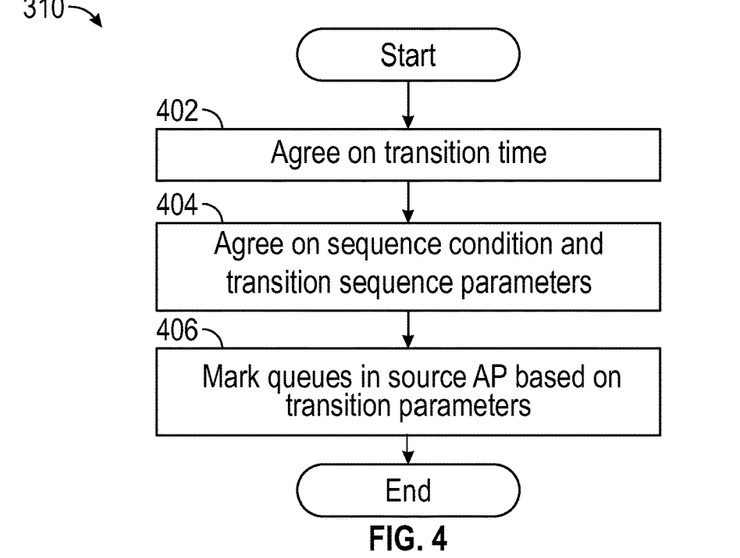
FIG. 4 is a flowchart illustrating the STA and APs agreeing on roaming conditions defined in terms of transition parameters, according to one embodiment.

FIG. 4 is a flowchart illustrating the STA and APs agreeing on roaming conditions defined in terms of transition parameters, according to one embodiment. In an embodiment, FIG. 4 corresponds with block 310 illustrated in FIG. 3. At block 402, an STA and one or more APs (e.g., a source AP, a target AP, or both) agree on a transition time.

For example, as illustrated in FIG. 1, the STA 104B can roam from a source AP 102A to a target AP 102B. The STA 104B and source AP 102A can agree on roaming conditions and parameters (e.g., a roaming time and a sequence number condition using one or more roaming sequence number(s) for one or more listed TID(s)), and can notify the target AP 102B. This is merely an example, and any combination of devices can agree on the roaming conditions and transition parameters. For example, the STA, source AP, and target AP can all agree on the roaming conditions and transition parameters.

In an embodiment, the STA 104B and source AP 102A agree on a handover time, after which MPDUs and MSDUs will be transmitted to the STA 104B from the target AP 102B rather than the source AP 102B. The STA 104B, the AP 102A, or both, can notify the target AP 102B of this handover time.

At block 404, the STA and one or more APs agree on a sequence condition defined in terms of transition sequence numbers. For example, returning to the example of FIG. 1, the STA 104B and source AP 102A can agree on an MPDU sequence number (e.g., a frame number), after which frames will be transmitted to the STA 104B by the target AP 102B rather than the source AP 102B. In an embodiment, the sequence number is per data flow. For example, the STA and AP(s) can agree on a sequence number for each flow designated by a TID. Thus, for a given TID, after the sequence number for that TID is reached, further frames will be transmitted by the target AP to the STA, rather than by the source AP to the STA. As discussed above in relation to FIG. 3, time and sequence number are merely examples. Any suitable roaming conditions and transition parameters can be used.

At block 406, the source AP marks its queues based on the transition parameters. In an embodiment, as discussed above, the source AP maintains one or more queues for data traffic (including management traffic) to the STA. Without defined roaming conditions and transition parameters, the source AP must continue to maintain data in its queues until the roaming transition is completed (e.g., the STA disassociates or de-authenticates, or the source AP is notified that the target AP is now serving the client). But this is one or more of unreliable, inefficient and wasteful.

Instead, the source AP can use the agreed upon roaming conditions and transition parameters to mark its buffers and determine when it will no longer need to maintain data for the transitioning STA in its buffers. For example, the source AP can use the transition sequence number to set an end point for maintaining data (e.g., for the relevant data flow marked by the associated TID) in its buffer for servicing the STA. After the transition sequence number, the STA will be serviced by the target AP instead of the source AP.

Figure 5:
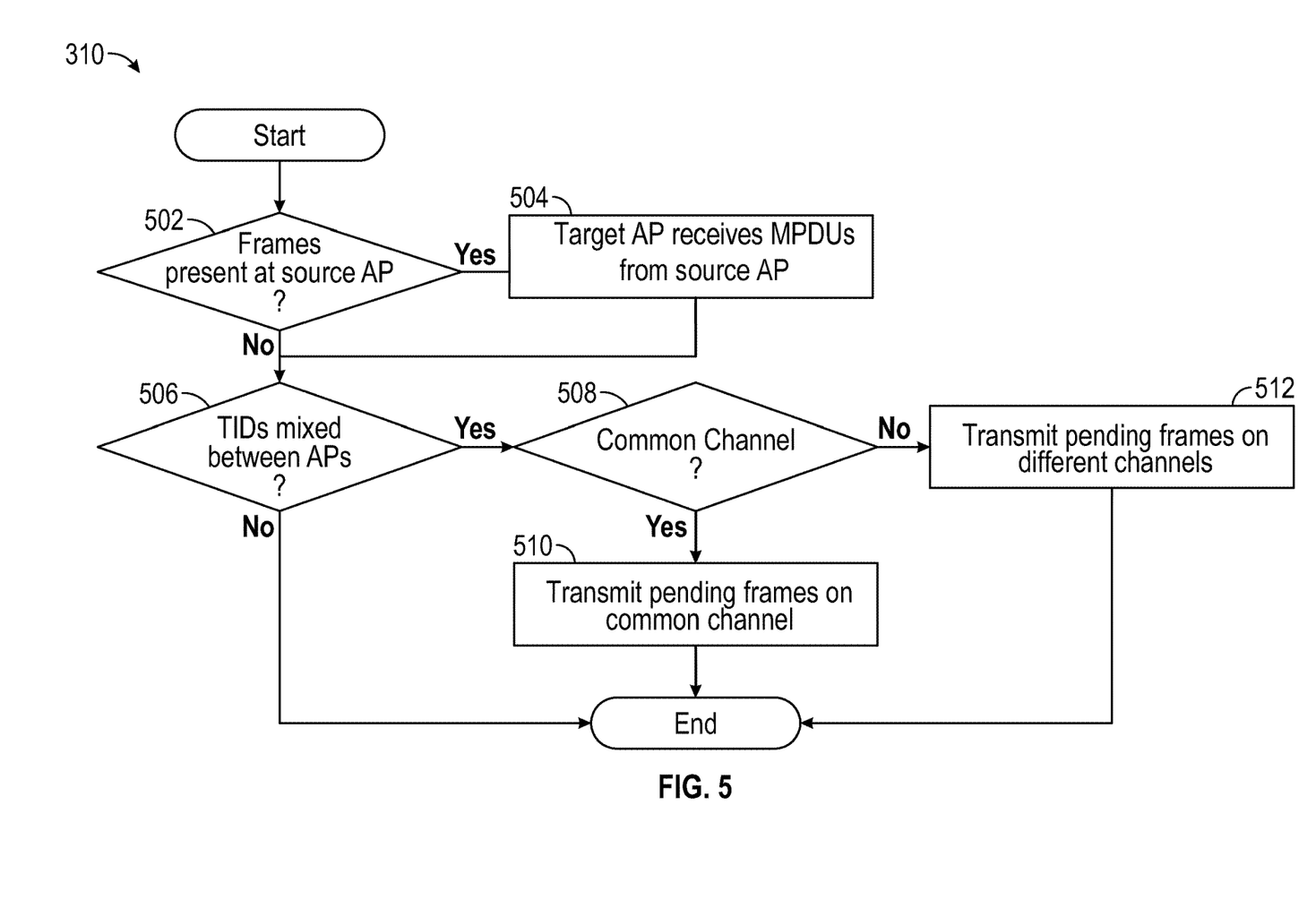
FIG. 5 is a flowchart illustrating transitioning an STA from a source to a target AP, according to one embodiment.

FIG. 5 is a flowchart illustrating transitioning an STA from a source to a target AP, according to one embodiment. In an embodiment, FIG. 5 corresponds with block 310 illustrated above in relation to FIG. 3. At block 502, a roaming service (e.g., the AP roaming service 212 illustrated above in relation to FIG. 2) determines whether data frames (e.g., MPDUs) are present at the source AP.

For example, as illustrated in FIG. 1, an STA 104B can roam from a source AP 102A to a target AP 102B. As discussed above in relation to FIGS. 3 and 4, in an embodiment, roaming is enforced when either a roaming time condition defined in terms of a transition time parameter, or a roaming sequence condition defined in terms of sequence number parameter(s), is met. If the transition time condition is met first, the STA may transition from the source AP 102A to the target AP 102B while data (e.g., MPDUs) remain queued at the source AP 102A.

For example, the time condition may be met before the sequence number condition if many retries are needed for transmission of data from the source AP to the STA prior to the transition (e.g., because of poor channel quality). A roaming service operating at the source AP can determine that MPDUs remain buffered at the source AP, and the flow proceeds to block 504. Alternatively, if the roaming service determines that no MPDUs remain present at the source AP (e.g., the sequence number parameter was reached first and the buffer at the source AP was fully flushed), the flow proceeds to block 506. This is merely an example, and any suitable service operating at any suitable network component can determine that MPDUs remain present at the source AP. Further, buffered MPDUs are merely one example of data remaining at the source AP. Any suitable data, including MSDUs, MMPDUs, AMSDUs, MPDUs and AMPDUs, can be present at the source AP.

At block 504, the target AP receives the MPDUs from the source AP. For example, the source AP 102A illustrated in FIG. 1 can tunnel queued MPDUs to the target AP 102B. As another example, the target AP 102B can retrieve MPDUs that remain queued at the source AP 102A. This is merely an example, and any suitable technique can be used. The flow then proceeds to block 506.

At block 506, the roaming service determines whether TIDs are mixed between APs. As discussed above in relation to FIGS. 3 and 4, in an embodiment the roaming service uses one or more per-TID sequence number(s) as roaming parameter(s). Such per-TID roaming parameters means that, in some circumstances, one or more data flows (e.g., designated by particular TIDs) will transition to the target AP while other data flows remain serviced by the source AP. That is, some TIDs will move to a new link while others need to be flushed on an older link. If TIDs are mixed between APs, the flow proceeds to block 508. If not, the flow ends and no pending frames need to be transmitted.

In an embodiment, the roaming service can select roaming conditions and transition parameters to avoid TIDs mixed between APs. For example, the roaming can select per-TID sequence numbers with the goal of flushing sessions (e.g., flushing block acknowledgment window sessions) before transferring from the source AP MLD to the target AP MLD.

At block 508, the roaming service determines whether a common channel is present for the source and target APs to serve the STA. For example, in an MLD implementation, a source AP and a target AP may operate on a common channel to serve the STA. If a common channel is present, the flow proceeds to block 510. If not, the flow proceeds to block 512.

At block 510, the roaming service transmits pending frames on the common channel. As discussed above, TIDs remain pending at both the source and target APs, but the APs operate on a common channel for the STA. Each AP can transmit pending data for the TIDs administered by the AP to the STA using the common channel.

At block 512, the roaming service transmits pending frames on different channels. As discussed above in relation to block 508 and 510, if the source and target APs operate on a common channel, pending frames for all TIDs can be transmitted to the STA using the common channel. If no common channel is present, however, the source and target STAs transmit the pending frames for the different TIDs using different channels.

In an embodiment, the STA can operate by alternating between channels. For example, the STA can alternate power save states between links with the source AP and the target AP. As another example, the STA can use one subset of MLD links from the source AP, and another subset of MLD links from the target AP, during the roaming transition. In an embodiment, the different subsets of MLD links do not overlap.

Figure 6:
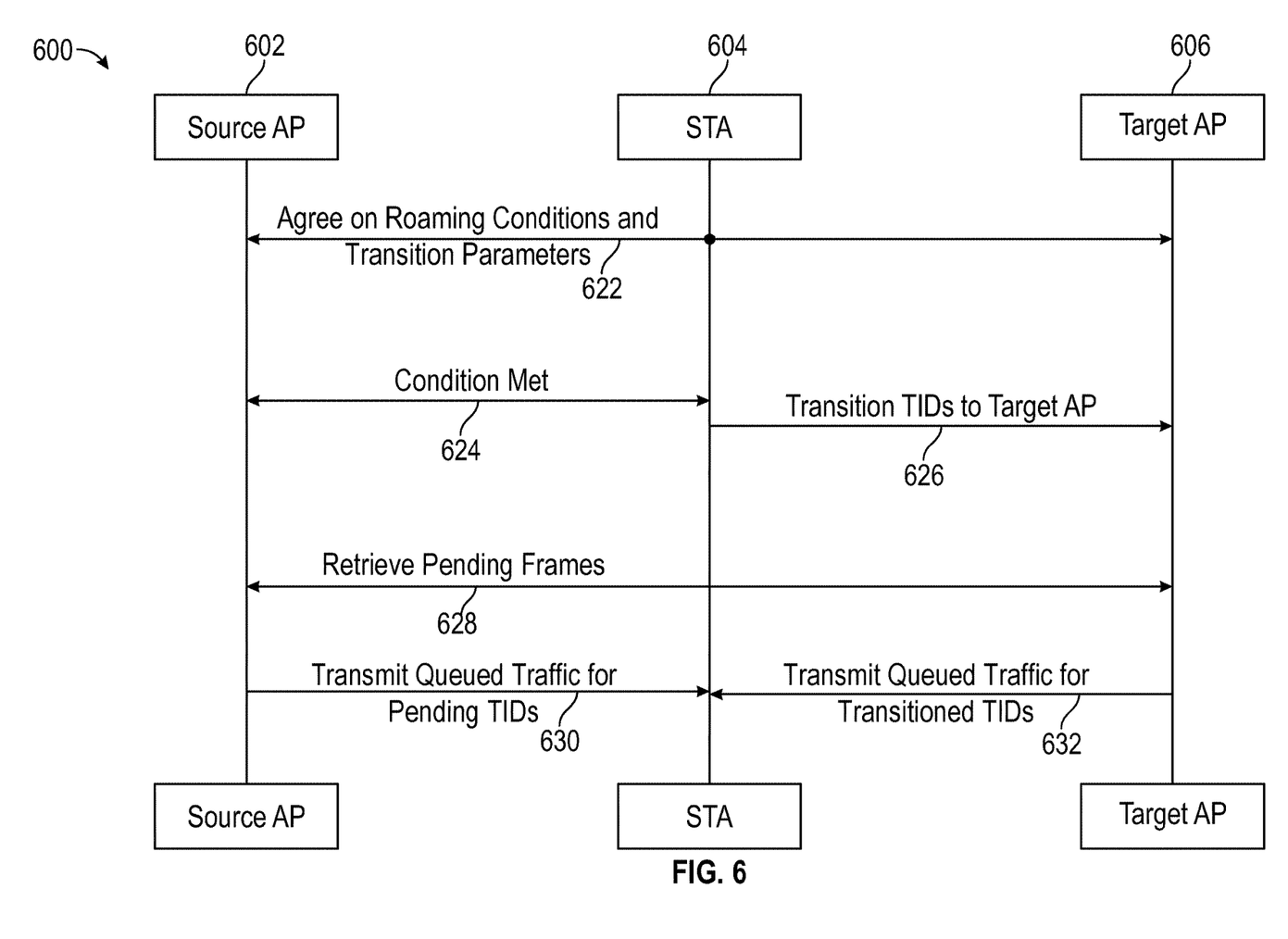
FIG. 6 is a message diagram illustrating orchestrated STA roaming, according to one embodiment.

FIG. 6 is a message diagram 600 illustrating orchestrated STA roaming, according to one embodiment. In an embodiment, at 622 a source AP 602 (e.g., the AP 102A illustrated in FIG. 1), an STA 604 (e.g., the STA 104B illustrated in FIG. 1), and a target AP 606 (e.g., the AP 102B illustrated in FIG. 1) agree on roaming conditions and transition parameters. For example, as discussed above in relation to FIG. 3, the source AP 602 and the STA 604 can agree on a number of roaming conditions and transition parameters. These parameters can include a transition time, transition sequence numbers (e.g., per-TID transition sequence numbers), and any other suitable roaming parameters. The source AP 602, the STA 604, or any other suitable device or combination of devices can notify the target AP 606 of the roaming conditions and transition parameters. This is merely an example, and the target AP 606, or any other suitable device or devices, can agree to the roaming conditions and transition parameters.

At 624, the source AP 602, the STA 604, or both, determine that one of the roaming conditions has been met. For example, as discussed above in relation to FIG. 3, the transition time condition can be met, or the sequence condition, defined in terms of per-TID transition sequence number parameter(s), can be met. These are merely examples.

At 626 the STA 604 transitions one or more TIDs from the source AP 602 to the target AP 606. As discussed above in relation to FIG. 5, in an embodiment different data flows (e.g., designated by different TIDs) can transition at different times based on reaching respective per-TID sequence number roaming conditions at different times. In this circumstance, at 626 the STA 604 transitions to the target AP for the appropriate data flows (e.g., designated by the respective TIDs).

At 628, the target AP 606 receives pending frames from the source AP 602. As discussed above in relation to block 502 illustrated in FIG. 5, if a transition time condition is met before a sequence number condition, the STA 604 may transition from the source AP 602 to the target AP 606 while data frames (e.g., MPDUs) remain buffered at the source AP 602. At 628 the target AP 606 receives any pending frames. For example, the source AP 602 can tunnel pending frames to the target AP 606. As another example, the target AP 606 can retrieve pending frames from the source AP 602.

At 630 the source AP 602 transmits queued traffic (MSDUs/MPDUs/etc.) for pending TIDs to the STA 604. At 632, the target AP transmits queued traffic (MSDUs/MPDUs/etc.) for transitioned TIDs to the STA 604. As discussed above in relation to 626, in an embodiment some TIDs remain pending at the source AP 602 while others are transitioned to the target AP 606. As discussed above in relation to blocks 506-512 illustrated in FIG. 5, the source AP 602 and target AP 606 transmit traffic for the respective TIDs to the STA 604 (e.g., using a common channel, by alternating MLD links, or using any other suitable technique).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
identifying a wireless client entity for roaming from a first infrastructure entity to a second infrastructure entity;
agreeing, between the client entity and the first infrastructure entity, on one or more roaming conditions defined using transition parameters for transition of a first data flow for the client entity from the first infrastructure entity to the second infrastructure entity, the one or more transition parameters comprising a sequence number relating to the data flow;
determining that a first condition defined in terms of a transition parameter of the agreed one or more roaming conditions is met; and
based on the determining, transitioning from providing the first data flow from the first infrastructure entity to the client entity to providing the first data flow from the second infrastructure entity to the client entity.

2. The method of claim 1, wherein the sequence number relating to the data flow comprises one or more sequence numbers for traffic identifiers (TIDs), and wherein the one or more transition parameters for the roaming conditions comprise the one or more sequence numbers for TIDs and a transition time.

3. The method of claim 2, wherein the one or more transition parameters further comprise a combining function relating to the one or more sequence numbers for the TIDs.

4. The method of claim 2, wherein determining that a first condition of the one or more roaming conditions is met comprises:
determining that the transition time condition is met prior to the sequence number condition.

5. The method of claim 4, further comprising:
identifying one or more frames for the wireless client entity remaining at the first infrastructure entity after the transition;
providing the one or more frames from the first infrastructure entity to the second infrastructure entity; and
providing the one or more frames from the second infrastructure entity to the client entity.

6. The method of claim 1, wherein the first data flow relates to a TID and wherein the one or more transition parameters for the sequence number condition comprise a plurality of sequence numbers each relating to a respective data flow, of a plurality of data flows for the client entity, each of the plurality of data flows relating to a respective TID.

7. The method of claim 6, wherein after the transitioning a first data flow of the plurality of data flows is provided by the first infrastructure entity to the client entity and a second data flow of the plurality data flows is provided by the second infrastructure entity to the client entity.

8. The method of claim 7, wherein the first data flow and the second data flow are both provided to the client entity using a common channel from the first infrastructure entity and the second infrastructure entity.

9. The method of claim 7, wherein the first data flow and the second data flow are provided to the client entity using different channels from the first infrastructure entity and the second infrastructure entity.

10. The method of claim 1, wherein the first infrastructure entity comprises a wireless access point (AP), the second infrastructure entity comprises an AP, and the agreed on one or more roaming conditions defined in terms of transition parameters are provided to the second infrastructure entity prior to the transition.

11. A system, comprising:
a processor; and
a memory having instructions stored thereon which, when executed on the processor, performs operations comprising:
identifying a wireless client entity for roaming from a first infrastructure entity to a second infrastructure entity;
agreeing, between the client entity and the first infrastructure entity, on one or more roaming conditions defined using transition parameters for transition of a first data flow for the client entity from the first infrastructure entity to the second infrastructure entity, the one or more transition parameters comprising a sequence number relating to the data flow;
determining that a first condition defined in terms of a transition parameter of the agreed one or more roaming conditions is met; and
based on the determining, transitioning from providing the first data flow from the first infrastructure entity to the client entity to providing the first data flow from the second infrastructure entity to the client entity.

12. The system of claim 11, wherein the sequence number relating to the data flow comprises one or more sequence numbers for traffic identifiers (TIDs), and wherein the one or more transition parameters for the roaming conditions comprise the one or more sequence numbers for TIDs and a transition time.

13. The system of claim 12, further comprising:
identifying one or more frames for the wireless client entity remaining at the first infrastructure entity after the transition;
providing the one or more frames from the first infrastructure entity to the second infrastructure entity; and
providing the one or more frames from the second infrastructure entity to the client entity.

14. The system of claim 11, wherein the first data flow relates to a TID and wherein the one or more transition parameters for the sequence number condition comprise a plurality of sequence numbers each relating to a respective data flow, of a plurality of data flows for the client entity, each of the plurality of data flows relating to a respective TID.

15. The system of claim 14, wherein after the transitioning a first data flow of the plurality of data flows is provided by the first infrastructure entity to the client entity and a second data flow of the plurality data flows is provided by the second infrastructure entity to the client entity.

16. A non-transitory computer-readable medium having instructions stored thereon which, when executed by a processor, performs operations comprising:
   identifying a wireless client entity for roaming from a first infrastructure entity to a second infrastructure entity;
   agreeing, between the client entity and the first infrastructure entity, on one or more roaming conditions defined using transition parameters for transition of a first data flow for the client entity from the first infrastructure entity to the second infrastructure entity, the one or more transition parameters comprising a sequence number relating to the data flow;
   determining that a first condition defined in terms of a transition parameter of the agreed one or more roaming conditions is met; and
   based on the determining, transitioning from providing the first data flow from the first infrastructure entity to the client entity to providing the first data flow from the second infrastructure entity to the client entity.

17. The non-transitory computer-readable medium of claim 16, wherein the sequence number relating to the data flow comprises one or more sequence numbers for traffic identifiers (TIDs), and wherein the one or more transition parameters for the roaming conditions comprise the one or more sequence numbers for TIDs and a transition time.

18. The non-transitory computer-readable medium of claim 17, further comprising:
   identifying one or more frames for the wireless client entity remaining at the first infrastructure entity after the transition;
   providing the one or more frames from the first infrastructure entity to the second infrastructure entity; and
   providing the one or more frames from the second infrastructure entity to the client entity.

19. The non-transitory computer-readable medium of claim 16, wherein the first data flow relates to a TID and wherein the one or more transition parameters for the sequence number condition comprise a plurality of sequence numbers each relating to a respective data flow, of a plurality of data flows for the client entity, each of the plurality of data flows relating to a respective TID.

20. The non-transitory computer-readable medium of claim 19, wherein after the transitioning a first data flow of the plurality of data flows is provided by the first infrastructure entity to the client entity and a second data flow of the plurality data flows is provided by the second infrastructure entity to the client entity.

* * * * *